United States Patent [19]
Mazepa

[11] 3,827,510
[45] Aug. 6, 1974

[54] POWER TOOL
[75] Inventor: Robert Mazepa, Liverpool, N.Y.
[73] Assignee: Rockwell International Corporation, Pittsburgh, Pa.
[22] Filed: July 12, 1972
[21] Appl. No.: 271,127

[52] U.S. Cl.................. 173/163, 279/16, 408/127
[51] Int. Cl............................................ B23b 45/00
[58] Field of Search .......... 408/127; 279/16, 17, 18, 279/1 J, 1 L; 64/8, 9 A, 21; 51/170 T; 173/163

[56] References Cited
UNITED STATES PATENTS
1,972,779  9/1934   Keadoska............................ 64/9 A
2,381,102  8/1945   Boyd.............................. 408/127 X
3,069,874  12/1962  Leto........................................ 64/8
3,359,008  12/1967  Stimmerman................... 408/127 X
3,443,399  5/1969   Pope et al........................... 64/21 X
3,617,143  11/1971  McKee............................. 408/127

Primary Examiner—Andrew R. Juhasz
Assistant Examiner—Z. R. Bilinsky

[57] ABSTRACT

A power driven hand tool having a special ball joint coupling assembly that couples the power output spindle to a tool holder to provide for relative angular displacement between the tool holder and the spindle.

11 Claims, 6 Drawing Figures

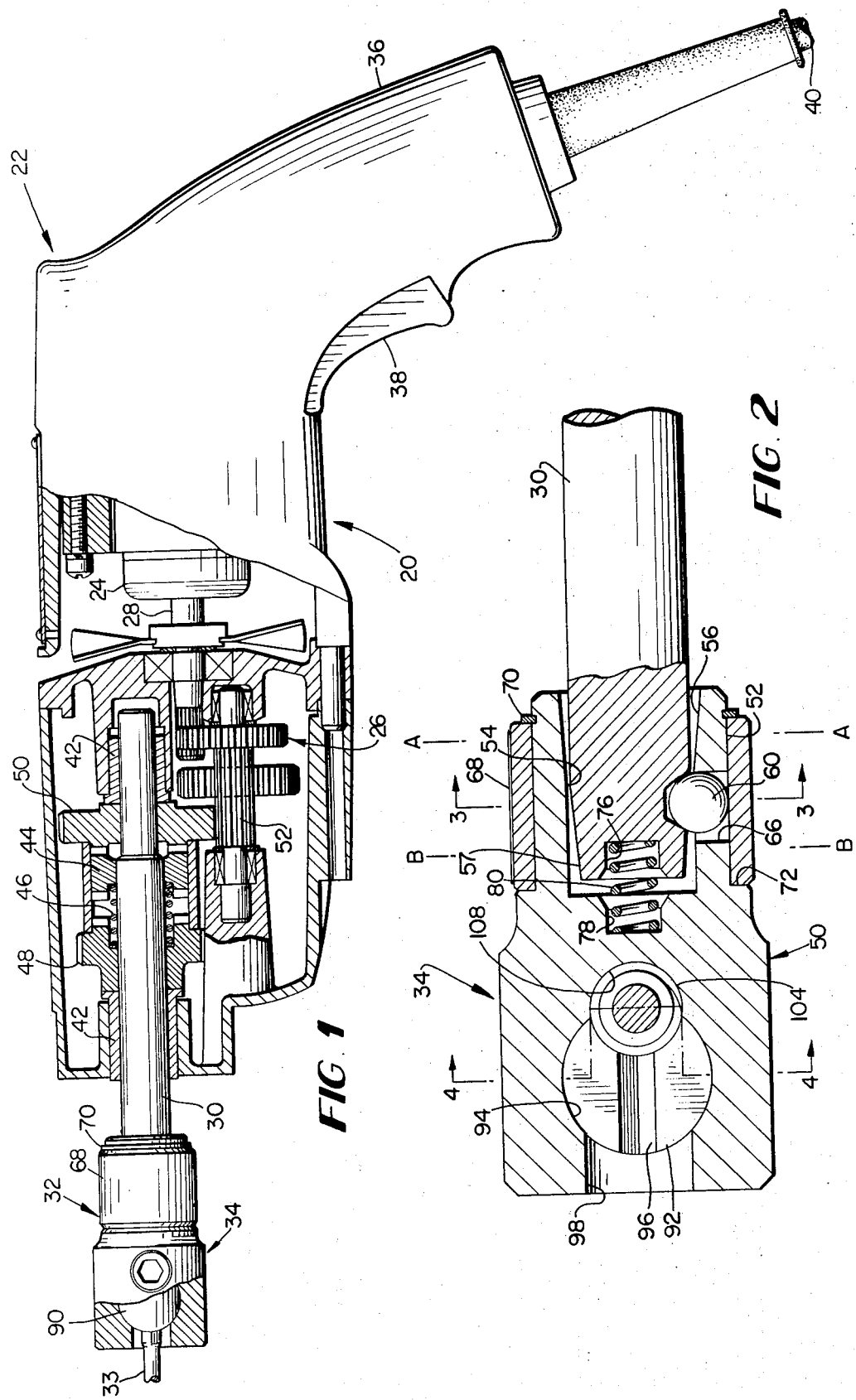

TORQUE APPLIED

NO TORQUE APPLIED

POWER TOOL

FIELD OF INVENTION

This invention relates to power tools and is particularly concerned with portable, power driven hand tools for tapping or reaming holes.

BACKGROUND

Prior to this invention various power driven hand tools have been proposed for tapping holes or bores. Examples of such tools are described in the following U.S. Pat. Nos.: 1,737,431 issue on Nov. 26, 1929 to R. A. Norling for *Portable Power Driven Tapping Tool*; and 1,752,422 issued on Apr. 1, 1930 to A. G. Decker for *Portable Electric Tapper*.

Special tool holders have also been previously proposed for supporting a tool bit, such as a tap or reaming bit, for rocking or floating movement to align a tap or reamer with the hole in the workpiece when the power driven spindle of the tool is misaligned with the hole in the workpiece. Examples of such tool holders and other flexible couplings are described in the folling U.S. Pat. Nos.: 1,682,444 issued to W. E. Trumpler on Aug. 28, 1928 for *Flexible Coupling*; 1,831,382 issued on Nov. 10, 1931 to E. Gairing for *Full Floating Universal Tool Holder*; 2,381,102 issued on Aug. 7, 1945 to L. B. Boyd for *Flexible Adapter*; 2,468,396 issued on Apr. 26, 1949 to P. E. Frisco for *Toolholder*; 2,772,094 issued on Nov. 27, 1956 to V. S. Jamilkowski for *Tool Holders*; 2,826,053 issued on Mar. 11, 1958 to H. Q. Munn for *Floating Tool Holder*; 2,981,544 issued on Apr. 25, 1961 to B. R. Better for *Floating Holders*; 3,135,979 issued on June 9, 1964 to F. W. Fiess for *Self-Aligning Tap Holders*; 3,173,700 issued on Mar. 16, 1965 to H. Klukos for *Floating Tool Holder*; 3,174,168 issued on Mar. 23, 1965 to F. C. Jones for *Self-Aligning Tool Holder*; and 3,359,008 issued on Dec. 19, 1967 to R. H. Stimmerman for *Boring Tool Holder for Drilling and Reaming Operations*.

Various tap drive mechanisms have been proposed as described, for example, in the previously identified patents 1,737,431 and 1,752,422 and also in the U.S. Pat. No. 2,950,490 issued on Aug. 30, 1960 to B. P. M. Schwartz for *Planetary Gear Reversing Drive Means Controlled By Snap Action Clutch Means*.

A major difficulty in performing such operations as tapping or reaming with power driven tools is the misalignment of the tap or other type of bit with the hole or bore in the workpiece. This problem is especially aggravated with power driven hand tools because of the difficulty involved in manually aligning the tool accurately with the hole or bore in the workpiece.

For the most part, the special tool holders described in the previously identified patents are complicated, relatively expensive constructions that are utilized in bench or floor tools. Thus, while these special tool holders provide motion of the tap or reamer to compensate for misalignment between the power driven spindle of the tool and the hole or bore in the workpiece, they are not practical or especially suitable for incorporation into a power driven hand tool.

SUMMARY AND OBJECTS OF INVENTION

One of the major objects of this invention is to provide a novel torque-transmitting coupling assembly for drive connecting a power driven part, such as a spindle, to a tool holder.

A more specific object of this invention is to provide a novel torque-transmitting coupling assembly that is especially adapted for use in a power driven hand tool to allow for angular displacement of the tool holder relative to the axis of the tool to accommodate minor angular misalignments between the tool axis and an aperture or other part of the workpiece to be worked upon.

According to the preferred embodiment, the novel coupling assembly of this invention is incorporated into a hand-manipulatable, power driven tapping tool for drive connecting a power driven spindle to the tool holder. The coupling assembly of this invention comprises a plurality of torque-transmitting balls that provide a ball joint connection between the power driven spindle and the tool holder and that further provide for a universal like rocking movement of the tool holder about the rotational axis of the power driven spindle. The torque-transmitting balls are seated in circumferentially spaced apart, shallow sockets or cavities in the outer end portion of the power driven spindle. The tool holder has a peripheral wall that defines an axially opening socket for receiving the outer end portion of the power driven spindle and the torque-transmitting balls. The socket-defining peripheral wall of the tool holder is formed with circumferentially spaced apart, enlarged, radial ball-retainer holes that loosely receive the torque-transmitting balls.

A retainer ring disposed around the socket-defining peripheral wall of the tool holder prevents the torque-transmitting balls from falling through the ball-retainer holes. A spring compressed between the outer end of the power driven spindle and the tool holder in the bottom of the tool socket axially biases the tool holder outwardly and away from the end of the power driven spindle so that corresponding axially facing edge regions of the ball-retainer holes will yieldably butt against the torque-transmitting balls when no torque is applied.

When no torque is applied the centers of the torque-transmitting balls are axially offset from a circumferential center line passing through the centers of the ball-retainer holes. Upon an application of torque, the torque-transmitting balls tend to seek positions along the circumferential center line. Thus, in addition to permitting angular misalignment between the power driven spindle and the tool holder, the torque-transmitting balls in the coupling assembly of this invention will exert a camming action in their retainer holes to tend to align the spindle and tool holder rotational axes when torque is applied by the power driven spindle. Thus, in absence of external radial forces, the camming action of the torque-transmitting balls in their retainer holes will straighten the tool holder so that its axis aligns with that of the power driven spindle when torque is applied.

The universal-like rocking movement afforded by the torque-transmitting coupling of this invention allows the tool holder to be aligned with aperture to be tapped even though an angular misalignment exists between the axis of the aperture and the axis of the tool or, more particularly, the axis of the tool driving spindle. In this manner, precision tapping and even other operations, such as reaming, is attained.

In addition to the foregoing features the torque-transmitting ball joint coupling assembly of this invention is rugged, provides a long service life, and is of simplified construction making it comparatively inexpensive to manufacture and easy to maintain.

Further objects of this invention will appear as the description proceeds in connection with the below-described drawing and the annexed claims.

DESCRIPTION OF DRAWINGS

FIG. 1 is a side elevation of a tapper incorporating the principles of this invention and having a portion of its casing broken away to illustrate interior details;

FIG. 2 is an enlarged, fragmentary, longitudinal section of the tool holder and torque-transmitting coupling assembly shown in FIG. 1;

DETAILED DESCRIPTION

Figure 3:
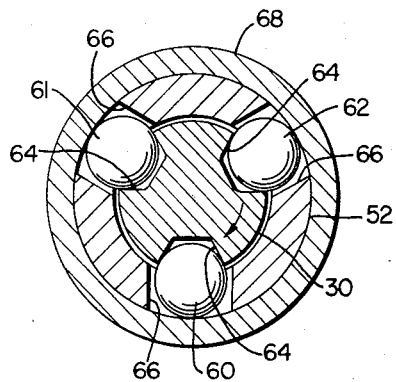
FIG. 3 is a section taken substantially along lines 3—3 of FIG. 2.

Referring to FIG. 1, a portable, hand-manipulatable tapper incorporating the principles of this invention is generally designated by the reference numeral 20 and comprises a hollow casing 22 in which an electric motor 24 and a gear and clutch drive mechanism 26 are mounted. Motor 24 may be of any conventional, suitable construction and comprises an armature shaft 28 that is drive connected by mechanism 26 to a power output spindle 30. Spindle 30 extends axially beyond the forward end of casing 22 and mounts the novel coupling and tool holder assembly of this invention. This coupling and tool holder assembly is generally indicated at 32. As will be described in greater detail shortly assembly 32 comprises a tool holder or chuck 34 in which a tap 33 or other tool bit is adapted to be mounted.

Casing 22 has a hollow, pistol grip-type handle 36 which houses an unshown switch assembly having a manually manipulatable trigger 38 for controlling operation of motor 24. Power is supplied to operate motor 24 through a conventional power cord 40 which extends into the butt end of handle 36. The conductors in power cord 40 are connected to the unshown switch in handle 36 and to motor 24 in the usual manner so that operation of trigger 38 will energize and de-energize motor 24.

Shaft 30 is rotatably mounted in casing 22 by bearings 42. Shaft 30 is axially displaceable between spaced apart tap-in and tap-out positions. It will be appreciated that mechanism 26 may be of any suitable conventional form for rotating shaft 30 in opposite, tap-in and tap-out directions.

In this embodiment, mechanism 26 comprises a clutch assembly having a driven clutch element 44 coaxially fixed on shaft 30 for rotation and axial displacement therewith. A coiled spring 46 peripherally surrounding shaft 30 in casing 22 reacts against a tap-out gear member 48 and bears against clutch element 44 to axially bias the assembly of clutch element 44 and shaft 30 to their tap-in positions. In its tap-in position, clutch element 44 engages clutch elements on a tap-in gear member 50. Members 48 and 50 are journalled on shaft 30, and are confined against axial displacement relative to casing 22. Mechanism 26 further includes a gear train 52 that drive connects shaft 28 to gear members 48 and 50 for rotating gear members 44 and 50 in opposite directions upon energization of motor 24.

When tap 33 is engaged in the aperture to be tapped and when the user pushes on the tapper, shaft 30 is axially displaced under the aid of spring 46 to cause clutch element 44 to engage the clutch teeth on tap-in gear 50. Shaft 30 will therefore be rotated in a tapping direction. Upon forming the threads in the aperture in the unshown workpiece it will be appreciated that the tap 33 will be engaged with the tapped threads in the aperture of the unshown workpiece so that the user of the tapper may then pull on the tapper to cause gear members 48 and 50 to be axially displaced relative to shaft 30 against the bias of spring 46. As a result, clutch element 44 will disengage from the clutch teeth on gear member 50 and will engage opposed clutch teeth on gear member 48 to cause shaft 30 to rotate in a direction that is reverse to the previously mentioned tapping direction. Rotation of shaft 30 in the reverse direction unthreads the tapping bit from the tapped hole.

Referring to FIG. 2, tool holder 34 comprises a rigid tool support body 50. The end of body 50 adjacent to casing 22 is formed with a peripheral, cylindrical wall 52 of substantially annular cross-section. Wall 52 defines an axially rearwardly opening blind bore or socket 54. Wall 52 and bore 54 are substantially coaxial with the axis of the tap 33 or other bit. The outer end of spindle 30 extending axially beyond the forward nose end of casing 22 is axially and loosely received in bore 54. Sufficient radial clearance is provided between spindle 30 and the internal, cylindrically smooth wall of bore 54 to permit body 50 to be rocked with a universal-like motion relative to the rotational axis of spindle 30.

From a region axially intermediate the bottom of bore 54 and the rearward end of body 50, the internal cylindrical surface of wall 52 is uniformly outwardly flared as indicated at 56 to provide an increased clearance between wall 52 and spindle 30 that allows a significant degree of angular misalignment of body 50 relative to the rotational axis of spindle 30.

The outer end portion of spindle 30 is tapered toward the end of the spindle as indicated at 57 in FIG. 2. to provide an increased clearance between bore 54 and the outer end portion of the spindle. The taper 57 cooperates with the flared region 56 of bore 54 to permit unhampered relative angular displacement between body 50 and spindle 30 throughout a limited angular distance that is sufficient to accommodate expected degrees of angular misalignments between spindle 30 and the workpiece aperture to be tapped or otherwise worked upon. Axially between the outwardly flared region 56 and the bottom of bore 54, the internal cylindrical surface of wall 52 is uniformly diametered.

As shown in FIGS. 2 and 3, the coupling assembly for transmitting torque from spindle 30 to body 50 comprises a series of preferably three rigid, solid, spherically contoured balls 60, 61 and 62. A segmental portion of each of the balls 60-62 is seated in a shallow socket or cavity 64. Sockets 64 are formed in the forward end portion of spindle 30 that is received in bore 54. Sockets 64 open radially outwardly and are equiangularly spaced apart about the periphery of spindle 30 as best shown in FIG. 3.

The surface of revolution defining each of the sockets 64 is contained in a conical envelope. Thus, the side wall of each of the sockets 64 is conically contoured.

The diameter of each of the torque-transmitting balls 60-62 is greater than the corresponding diametrical dimension of each socket 64 at the outer periphery of spindle 30, and the radial depth of each socket 64 is greater than corresponding radial dimension of each segmental portion of the torque-transmitting ball that is received in the socket so that each of the torque-transmitting balls 60-62 is spaced from the bottom of its socket 64.

By virtue of being seated in sockets 64, the centers of ball 60-62 are substantially contained in a common plane normally intersecting the rotational axis of spindle 30.

The portion of each of the balls 60-62 protruding radially beyond the periphery of spindle 30 is loosely and radially received in a cylindrically smooth, uniformly diametered retainer bore or hole 66 that is formed radially through wall 52. The longitudinal, radially extending axes of bores 66 are substantially contained in a common plane that normally intersects the longitudinal axis of bore 54. The dimensions of spindle 30, wall 52, and balls 60-62 are such that balls 60-62 do not protrude radially beyond bore 66 and instead are closely tangential to a uniformly diametered cylinderical envelope containing the outer, uniformly diametered periphery of wall 52.

To retain ball 60-62 in sockets 64, an annular retainer ring or race 68 interfittingly and periphery surrounds wall 52 to cover the ball retainer bores 66. Ring 68 is axially confined against movement axially between a locking ring 70 and an annular shoulder 72. Shoulder 72 is exteriorly formed on body 50, and ring 70 is removably seated in an annular, circumferentially extending, outwardly opening groove that is formed in wall 52 near the rearward end of body 50.

Each of the torque-transmitting balls 60-62 is confined against radial displacement between the conical seating surface of its associated socket 64 and the internal uniformly diametered cylindrically smooth periphery of retainer ring 68. The diameters of retainer bores 66 are uniform and are significantly greater than the uniform diameters of balls 60-62 so that when ball 60-62 are in the position shown in FIG. 2 where they separably butt against the axially forwardly facing cylindrical wall regions of bore 66, a plane containing the centers of ball 60-62 and normally intersecting the axis of bore 54 will be significantly axially offset rearwardly from a plane containing the radially extending, longitudinal axes of bore 66. The purpose of this feature will be described shortly.

As shown in FIG. 2, a short, blind, axially forwardly opening bore 76 is coaxially formed in the outer end of spindle 30. A corresponding bore 78 opening axially towards bore 76 is coaxially formed in body 50 along an axis aligning with the axis of bore 54. A coiled compression spring 80 is received at opposite ends in bores 76 and 78 and is seated against the axially opposed flat bottoms of bores 76 and 78. Spring 80 axially biases body 50 forwardly and outwardly from spindle 30.

Axial displacement of body 50 in opposite directions relative to spindle 30 is limited by abutment of balls 60-62 with regions of the cylindrical walls of bores 66. Thus, axial displacement of body 50 under the influence of spring 80 is limited by abutment of balls 60-62 with the walls of bores 66.

When body 50 is angularly positioned so that the axis of bore 54 aligns with the rotational axis of spindle 30, the longitudinal axis of bores 76 and 78 will also be aligned. The axial clearance that is provided between the balls 60-62 and the cylindrical walls of bores 66 is sufficiently small to prevent the forward end of spindle 30 from seating against the bottom of bore 54. In yieldably urging spindle 30 and body 50 in axially opposite directions, spring 80 prevents loose play or slop between body 50 and spindle 30.

Retainer 68 provides a non-yielding rigid seat that bears against balls 60-62, tending to center balls 60-62 in sockets 64.

By providing sockets 64 with concially contoured sidewalls the engagement of balls 60-62 in the sockets are confined to substantially a line of bearing contact which will be maintained even when body 50 is tilted or angularly displaced relative to spindle 30. The conically configured sidewalls of sockets 64 also prevent balls 60-62 from locking in sockets 64.

The segmental portion of each of the balls 60-62 protruding radially beyond the periphery of spindle 30 is significantly greater than the segmental portion of the ball that is received in socket 64.

Figure 4:
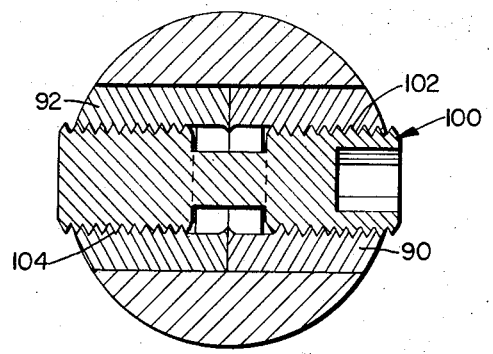
FIG. 4 is a section taken substantially along lines 4—4 of FIG. 2.

As shown in FIGS. 1, 2 and 4, tool holder 34 further comprises a pair of axially aligned, adjustable jaws 90 and 92 for mounting a tap or other tool bit. Jaws 90 and 92 are slidably and coaxially mounted in a transverse bore 94 that is formed through body 50 along an axis normally intersecting the axis of bore 54. The axially opposed end faces of jaws 90 and 92 are formed with opposed, complimentary notches 96 (see FIG. 2) that interfittingly mate with the non-circular, usually square cross-sectioned shank of the tap. The tap or other tool bit is adapted to be coaxially inserted through a longitudinal hole or bore 98 in body 50 to position its shank end between jaws 90 and 92. The shank of the tap will seat in notches 96 and will be non-rotatably clamped and axially fixed between jaws 90 and 92 upon axial displacement of jaws 90 and 92 toward each other.

Jaws 90 and 92 are axially adjustable toward and away from each other by manipulation of any suitable means such as a screw member 100 that is rotatably mounted in body 50. Member 100 has axially spaced apart cylindrical threaded sections 102 and 104 that engage threads in body 50 and threads on adjacent faces of jaws 90 and 92 respectively. The threads on section 102 are of opposite pitch relative to the threads on section 104, one being right-hand threads and the other being left-hand threads so that by turning screw member 100 in one direction or the other, jaws 90 and 92 will simultaneusly be moved in reverse directions to clamp or unclamp a tap.

Figure 5:
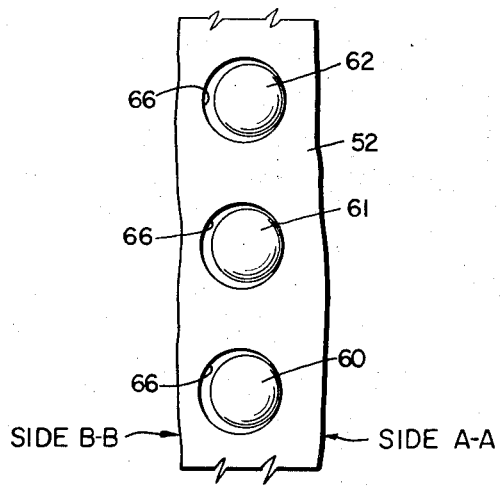
FIG. 5, which is a developed view of the circumferentially disposed torque-transmitting balls and ball-retainer holder between lines A—A and B—B in the assembly of FIG. 2, illustrates the positions of the torque-transmitting balls in the ball-retainer holes of the tool holder when no torque is applied to the power output shaft or spindle of the tool.

When no torque is applied to spindle 30, the bias of spring 80 will be effective to yieldable urge tool holder 34 to its forward most position when the centers of balls 60-62 are rearwardly and axially offset from the longitudinal axes of retainer bores 66 by a maximum distance (see FIG. 5). When motor 24 is energized to apply torque to spindle 30, balls 60–62 will transmit the spindle torque to body 50, and tool holder 34 will rotate with spindle 30.

Figure 6:
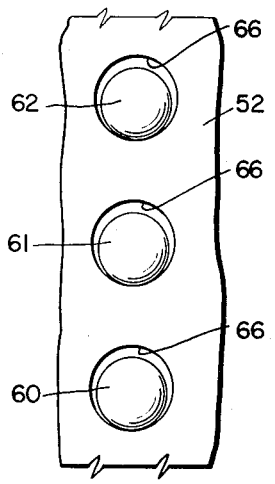
FIG. 6 is a view similar to FIG. 5, but showing the positions to which the torque-transmitting balls tend to move in the ball-retainer holes of the tool holder when torque is applied to the power output spindle of the tool.

Upon application of torque, balls 60-62 tend to seek positions along a circumferential centerline that intersects the longitudinal, radially extending axes of bores 66 (see FIG. 6). That is, balls 60–62 will tend to move to positions where their centers lie in a transverse plane that contains the longitudinal, radially extending axes of bores 66. In these positions it will be appreciated that the centers of balls 60–62 are still offset relative to the longitudinal axes of bores 66 because of the greater diameters of bores 66. It also will be appreciated that displacement balls 60–62 toward the positions shown in FIG. 6 will result in a camming action that causes a corresponding relative axial displacement between holder 34 and spindle 30. If holder 34 is axially aligned with spindle 30 when torque is applied, balls 60–62 will move relative to bores 66 substantially to the positions shown in FIG. 6.

If, in addition to applying torque, an angular misalignment is introduced between holder 34 and spindle 30, the positions of balls 60–62 must shift relative to the longitudinal axes of bores 66. Depending upon the instantaneous location or orientation of any given torque-transmitting ball in its circular path of rotation coaxially about the axis of spindle 30, the given torque-transmitting ball may become free of load or may assume the entire load when holder 34 is angularly misaligned relative to spindle 30.

When the longitudinal axis or centerline of one of the retainer bores 66 lies in a plane that is common to the misaligned axes of holder 34 and spindle 30, then that retainer bore will normally effect the entire driving connection. For the displacement of that ball-retainer bore (due to the misalignment of holder 34 and spindle 30 from the plane of balls 60–62) will exceed that of the other two ball-retainer bores since the latter will be located at a lesser distance from the center of rotation. Since radial displacement of holder 34 on spindle 30 is prevented or limited by the fit of parts in assembly 32, equalization of the three torque-transmitting balls 60–62 cannot occur.

The center of one of the balls 60–62 enters the plane containing the axes of holder 34 and spindle 30 with every 60° of rotation. Thus, a concentration of a substantial part of the load at one of the balls 60–62 occurs every 60° of rotation and a sharing of the load amongest balls 60–62 occurs during the intervening periods.

When the axes of holder 34 and spindle 30 are angularly misaligned, holder 34 will straighten itself and return to axial alignment with spindle 30 upon application of torque if no opposing radial force is applied to the holder. This self-aligning motion of holder 34 is attributable to the camming action of balls 60–62 against the cylindrical walls of bores 66. This camming action is brought about by the bias exerted by spring 80. More particularly, it will be appreciated that spring 80 tends to urge holder 34 forwardly to relatively locate balls 60–62 and bores 66 in the positions shown in FIG. 5. When balls 60–62 are displaced relative to bores 66 and away from their positions shown in FIG. 5 upon application of torque, spring 80 continues to exert its bias that causes balls 60–62 to cam against the cylindrical walls of bores 66, and this camming action provides the force for urging holder 34 back to a position where the rotational axis of body 50 axially aligns with that of spindle 30.

From the foregoing description it will be appreciated that the rotational axis of body 50 will always substantially angularly intersect the rotational axis of spindle 30 when body 50 and spindle 30 are misaligned.

It also will be appreciated that balls 60–62 support and couple holder 34 to the outer end of spindle 30.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a power tool, a rotatably mounted, power driven, tool-driving spindle, a tool-mounting chuck having an axially opening socket receiving an end portion of said spindle with a loose fit that permits angular motion of said chuck relative to said spindle, torque-transmitting ball joint coupling means engaging said chuck and said end portion for drive connecting said spindle to said chuck and for providing universal like rocking motion of said chuck relative to the rotational axis of said spindle, and a spring engaging said chuck and reacting against said spindle to bias said chuck forwardly of said spindle, the engagement of said ball joint coupling means with said chuck and said end portion being effective to limit the displacement of said chuck under the bias exerted by said spring.

2. In a power tool, a rotatably mounted, power-driven, tool-driving spindle, a tool holder having an axially opening socket receiving an end portion of said spindle, torque transmitting coupling means drive connecting said end portion to said tool holder and providing for universal like rocking motion of said tool holder relative to the rotational axis of said spindle and spring means confined and compressed between the end of said end portion and the bottom of said socket for taking up axial play between said tool holder and said coupling means, the engagement of said torque transmitting coupling means with said tool holder and said end portion being effective to limit the displacement of said tool holder under the bias exerted by said spring, whereby said tool holder is axially self-aligning with respect to said spindle.

3. In a power hand tool, a casing, a power driven spindle rotatably supported by said casing, a tool holder having an axially directed socket receiving an end portion of said spindle with a fit permitting relative angular motion between said tool holder and said spindle, means coupling said tool holder to said end portion and comprising a plurality of torque-transmitting balls for imparting rotation of said spindle to said tool holder and providing for rocking motion of said holder relative to the rotational axis of said spindle, and spring means causing said balls to exert an axial camming action of said tool holder with respect to said spindle that urges said tool holder to a position where its rotational axis axially aligns with that of said spindle whereby said tool holder is self-aligning with respect to said spindle.

4. In a power hand tool having a casing, a spindle rotatably supported by said casing and having an end portion extending beyond said casing, drive means for imparting rotation to said spindle, a tool holder having a socket receiving said end portion with a fit that permits relative angular motion between said tool holder and said spindle, said end portion being formed with a plurality of radially outwardly opening, circumferentially spaced cavities, said tool holder having a wall portion that defines said socket and that is formed with a plurality of circumferentially spaced apart holes opening into said socket, means coupling said tool holder to said spindle and comprising a plurality of torque-transmitting balls seated in said cavities and loosely received in said holes for transmitting torque from said spindle to said holder and for allowing relative rocking motion between said holder and said spindle, and spring means axially biasing said tool holder and said spindle relatively in opposite directions to take up axial play that is introduced between said holder and said spindle by the loose fit of said balls in said holes.

5. The power hand tool defined in claim 4 wherein said spring means comprises a spring compressed between the bottom of said socket and the end of said spindle that is received in said socket.

6. In an electrically powered hand tool having a casing, a spindle rotatably mounted in said casing and having an end portion extending beyond said casing, an electric motor mounted in said casing for rotating said spindle, a tool holder having a socket opening toward said casing and receiving said end portion with a fit that permits relative angular motion between said holder and said spindle, said end portion being formed with a plurality of circumferentially spaced apart radially outwardly opening cavities, and said tool holder having a wall portion that defines said socket and that is formed with a plurality of circumferentially spaced apart holes opening into said socket, ball joint means coupling said tool holder to said spindle and comprising a plurality of torque-transmitting balls each seated in one of said cavities and received with a loose fit in one of said holes for imparting rotation of said spindle to said holder and for enabling said holder to be rocked relative to said spindle to permit relative misalignment of the rotational axes of said holder and said spindle, and spring means urging said holder forwardly of said spindle to take up axial play that is introduced between said holder and said spindle by the loose fit of said balls in said holes, said holes being defined by wall surfaces that are abuttable with said balls to limit relative axial displacement between said holder and said spindle under the bias of said spring means, said holes being sufficiently large relative to the diameter of said balls that said holder is biased by said spring means to a position where said holes are eccentric to said balls when no torque is applied to said holder by said spindle, the torque applied to said spindle effecting displacement of said balls relative to said holes against the bias of said spring means, and said balls exerting a camming action against said wall surfaces to urge said holder to a position where its rotational axis is axially aligned with that of said spindle when torque is applied to said spindle.

7. The electrically powered hand tool defined in claim 6 wherein said spring means comprises a spring compressed between the bottom of said socket and the end of said spindle that is received in said socket.

8. The electrically powered hand tool defined in claim 6 wherein said holes are formed through said wall portion and wherein a ball-retainer sleeve peripherally surrounds said wall portion to cover said holes, said balls being confined against radial displacement between the spindle surfaces defining said cavities and said sleeve.

9. The electrically powered hand tool defined in claim 6 comprising means for retaining said balls in seating engagement in said cavities and for confining said balls against radial outward displacement, each of said cavities having a substantially conically contoured side wall surface that engages its associated torque-transmitting ball substantially only along a line of bearing contact.

10. The electrically powered hand tool defined in claim 6 wherein said end portion is received in said socket with a loose fit, wherein the centers of said balls are substantially contained in a common plane that normally intersects the rotation axis of said spindle, wherein said end portion is tapered from a place in the region of said plane to the end of said spindle in said socket, and wherein the mouth of said socket is outwardly flared to cooperate with the taper on said end portion to allow relative rocking motion between said holder and said spindle.

11. The electrically powered hand tool defined in claim 6 wherein means drive connecting said motor to said spindle comprises clutch means for selectively effecting rotation of said spindle in opposite direction.

* * * * *